Patented May 20, 1924.

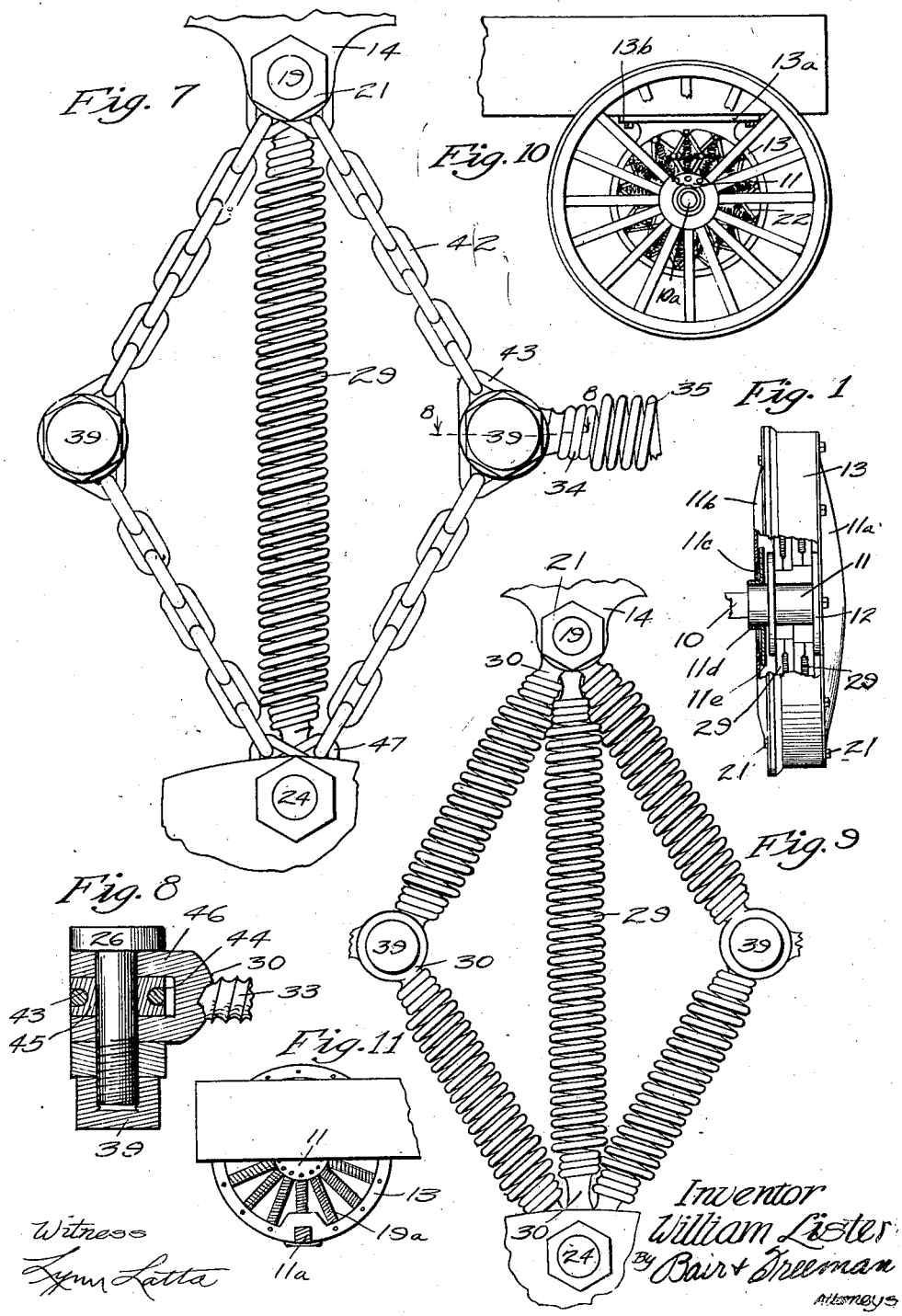

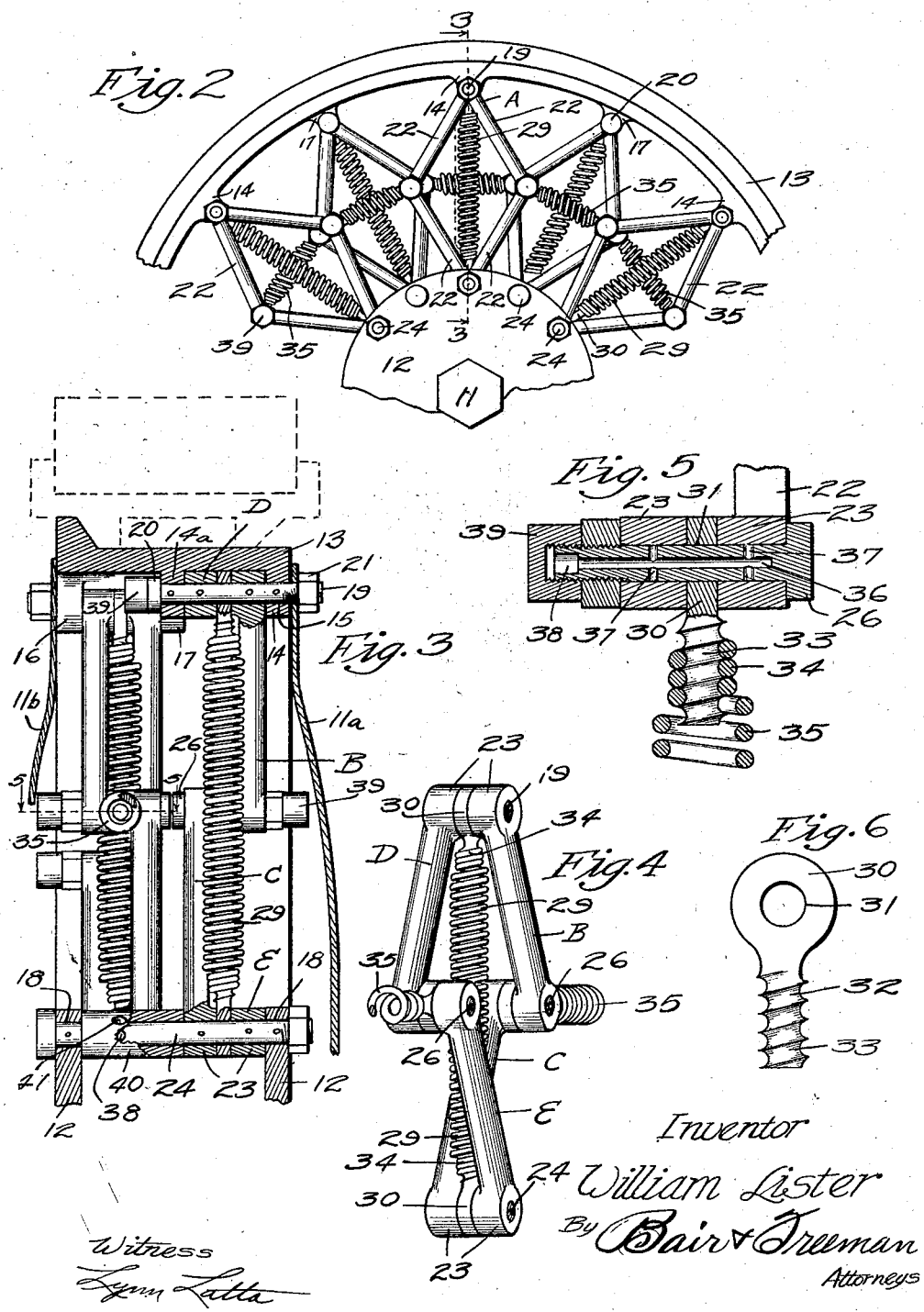

1,494,849

UNITED STATES PATENT OFFICE.

WILLIAM LISTER, OF DES MOINES, IOWA.

RESILIENT WHEEL.

Application filed April 3, 1922. Serial No. 549,228.

*To all whom it may concern:*

Be it known that I, WILLIAM LISTER, a citizen of the United States, residing at Des Moines, in the county of Polk and State of Iowa, have invented a certain new and useful Resilient Wheel, of which the following is a specification.

The object of my invention is to provide a resilient wheel of simple, durable and inexpensive construction, which will be capable of taking the place of the ordinary pneumatic tire now used on automobiles.

A further object of my invention is to provide such a wheel having a felly and a hub connected by a series of arms or spokes arranged in pairs pivoted at their centers and having springs to resist the pivotal movement of said arms.

A further object is to provide a wheel having arms as described, and also means for lubricating the pivotal connections of said arms.

A further object is to provide a wheel as described and having protective plates on either side to keep dust and other foreign matter from reaching the aforedescribed arms.

A further object is to provide a wheel having arms as described, and means for pivotally anchoring springs to the pivot joints of said arms.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 shows an end elevation of a wheel embodying my invention, upon which a rim and tire may be placed, parts being broken away and parts being shown in central, vertical section.

Figure 2 is a front elevation of the upper portion of my wheel, the outer casing not being shown.

Figure 3 is a vertical, sectional view taken on the line 3—3 of Figure 2, the protective plates or casings being shown in section, and a rim and tire being shown in dotted lines.

Figure 4 is a perspective view of one of the spokes of my wheel, the pivot bolts being shown in section.

Figure 5 is a sectional view on the line 5—5 of Figure 3, illustrating one of the pivot bolts and the method of lubricating the interior of the bushings of the links forming my spoke.

Figure 6 is a detail of one of the members used to connect the springs to the spokes.

Figure 7 is a modified form of one of the spokes embodying my invention, chains being shown instead of the solid links.

Figure 8 is a detail, sectional view, similar to Figure 5, taken on the line 8—8 of Figure 7.

Figure 9 is a modified form, similar to Figure 7, springs being shown in place of the solid links.

Figure 10 is a modified form of my invention used as a resilient mounting for the axle of the vehicle; and Figure 11 is a modified form of a similar resilient mounting having a slightly different arrangement of springs.

In the accompanying drawings I have used the reference numeral 10 to indicate the axle of a vehicle upon which my wheel may be installed. The hub 11 is received over the axle 10 and has two spaced annular flanges 12 whose purpose will be hereafter more fully described.

A felly 13 shown in cross section in Figure 3 has inwardly projecting lugs 14 in which are the holes 15 to receive the pivotal bolts hereafter more fully described.

The lugs 14 are equidistantally spaced around the felly 13 and laterally spaced from the lugs 14 approximately in the center of the felly are similar lugs 14ª. Spaced equidistantally around the circumference between the lugs 14 are similar pairs of lugs 16 and 17 on the other side of the felly.

In the annular flanges 12, previously described, and spaced radially in line with each of the holes 15 in the lugs 14 are the holes 18.

Through the holes 15 and the lugs 14 and 14ª are received pivot bolts 19 having heads 20 and nuts 21.

To connect the hub 11 with the felly 13 I have provided spokes, each in the shape of a parallelogram composed of links 22. Referring to one of the parallelograms, which in Figure 2 I have designated as A; see also Figure 4.

Received on the bolt 19 adjacent to the lug 14 is a link 22 which I shall call B, having bushings 23 on either end of sufficient width to effectively resist such lateral strains as the link 22 may be subjected to.

Through two of the holes 18 which are in line radially with the hole 15 is passed the bolt 24 of greater length than the bolt 19, and received on the bolt 24 and spaced from the flange 12 by a distance a little greater than the bushing 23 is another link C similar to the link B.

The links B and C at their free ends are connected by means of a bolt 26 similar to those already described.

It will now be seen that the arrangement just described forms an arm connecting the felly 13 to the hub 11, being pivoted at its center.

The links B and C are of such length that they will be held at an angle to each other.

On the bolt 19 is another link D parallel to the link C and directly above it. On the bolt 24 is another link E parallel to and directly below the link B.

The links D and E are fastened together at their free ends in the same manner as the links B and C, and extend in the opposite direction.

The arrangement of the links just described forms a parallelogram, which I will designate by the letter A, with each of the four vertices acting as a pivot.

When the hub 11 is in the center of the felly 13 each of these parallelograms have practically the form shown in Figure 2 of the drawings.

The addition of a load to the axle 10 would tend to elongate those parallelograms or spokes situated above the axle.

In order to resist this tendency and provide a means to hold them normally in this shape and at the same time yield slightly to an increase in the downward pull on the axle I have provided springs 29 pivotally connected to the bolts 19 and 24 by means of eye-bolts 30 having openings 31 and bolts 32.

The bolts 32 have screw grooves 33 and the ends of the springs 29 are coiled in reduced portions 34 to form threads of the same pitch as the grooves 33.

The eye bolts 30 are received on the bolt 19, and between the bushings 23 of the links B and D above, and similarly the links C and E below.

The reduced portions 34 are screwed on to the bolts 32, thus it will be seen that I have provided a very simple anchoring device for the springs 19 from which they may be readily detached and which allows pivotal movement of the spring with relation to the links 22, etc.

It may here be explained that the torsional pull on the hub when the power is applied will also have a tendency to elongate the parallelograms forming the spokes and at the same time to cause a slight pivotal movement upon the bolts 19 and 24 because of the displacements of the bolt 24 circumferentially.

This of course will also be resisted by the springs 29 which themselves will pivot slightly on the same pivot.

In order to increase the resilient effect and aid the work of the springs 29 I have provided the short springs 35 connected to the central joints of the spokes by means of similar eye bolts 30 which are received over the bolts 26 between the links B and C on one side, and the links D and E on the other.

The springs 35 extend outwardly and laterally from the parallelogram A and are connected to the next adjacent parallelogram or spoke in the manner described.

These springs it will be seen will be strained by the elongation of the parallelograms. These springs also when on the underside of the wheel will be put under compression by the drawing of the parallelograms laterally.

Referring to the bushings 23 it will be seen that any side strain in either direction on either the felly or the hub will be resisted by the width of these bushings.

In order to make the bushings pivot freely upon each of the bolts I have provided in each of the bolts 19, 24 and 26 central openings 36 connected by smaller holes 37 to the exterior surface of the bolt.

At the points where lubrication is needed between the bushings 23 and the bolts, the hole 36 is closed at one end and at the other end is an enlarged portion 38 into which the nozzle of a grease gun may be inserted for filling the hole with grease. A cap 39 closes the opening 38 and also acts as a lock nut being screwed on to the threaded end of the bolt.

The bolt shown in my illustration is the particular bolt 26 connecting the links B and C. In the bolt 19, the openings 38 and the cap 39 will be situated at the other end of the bolt, that is next to the head 20, since there is more room on the inside of the wheel.

A series of spokes or parallelograms which have just been described might be situated exactly in the center of the felly; but for greater strength and a greater resiliency I have provided two sets, the spokes of one set being spaced between the spokes of the other set. This will increase the rigidity of the structure in resisting side strains, and by increasing the number of springs will also increase the resiliency of the wheel.

The other set or the set which is situated on the inside will be fixed to the lugs 16 and 17 before described.

The bolts 24 will extend the complete width of the wheel and in order to hold the link C in position a sleeve 40 is received on the bolt 24 and may have a hole 41 registering with the opening 38, to serve the purpose of injecting grease. By turning the sleeve 40 the opening 38 will be closed.

In order to protect the working parts of the wheel from dust I have provided two casing members or cover plates 11$^a$ and 11$^b$ respectively.

The plate 11$^b$ has a central opening 11$^c$ approximately twice as large as the hub, which projects through it. This is to allow up and down movement of the hub within the opening 11$^c$.

On the hub 11 there is a sleeve 11$^d$ having an annular flange or cover member 11$^e$ adjacent to the inner surface of the plate 11$^b$ which serves the purpose of closing the hole 11$^c$. The plates 11$^a$ and 11$^b$ are fastened to the felly 13 by means of the bolts 19 and the nuts 21.

In Figure 7 I have shown a modified form of my device, showing one of the spokes in which chains 42 have been substituted for the links 22. The chains are connected to the bolts 26 by means of triangular shaped links 43 which are received in the annular groove 44 in a sleeve 45 which takes the place of the bushings 23.

The eye bolts 30 have bifurcated arms 46 and the sleeve 45 is received between the forks 46. Links 47 similar to the links 43 fasten the chains 42 to the pivots 19 and 24 respectively. Here the side strain will be overcome by the peculiar arrangement whereby half of the spokes are situated half on one side and half on the other side of the wheel.

In Figure 9 I have illustrated how the links 22 may be replaced by springs hereby increasing the resiliency of the wheel.

Figure 10 is a modified form of my device, illustrating the manner in which it may be applied as a spring to any type of vehicle.

The rim 13 has at its top a flattened portion 13$^a$ with holes to receive the bolts 13$^b$ to fasten it to the wagon box or the like. The axle 10$^a$ of the vehicle is passed through the hub 11 of the spring mounting.

Figure 11 shows a slightly modified form of such a spring mounting whereby the axle is fastened to the rim 13 and the hub 11 is fastened to the box of the vehicle. Springs 19$^a$ may be substituted for the arrangement of links described in the other forms.

The advantages of my improved spring wheel are obvious. It is a well known fact that one of the greatest expenses involved in the upkeep of a car is that of tires. I substitute a solid tire which will have much greater wearing capacity than the ordinary pneumatic tire.

I thus effect a great saving and my improved resilient wheel performs the same function as the pneumatic tire now does.

My construction as shown will provide a wheel as rigid and as substantial as the present wheel in resisting side strains.

By providing means for lubricating the joints of the spokes my wheel will be rendered noiseless and smoothly operating. It is obviously an advantage to protect the working parts from dust since they will be thereby rendered very durable and will probably outlast the life of the car itself.

It will be seen that the construction of my improved spring wheel involves the use of less than a dozen different parts, since all of the links comprising the spokes are exact duplicates. The construction therefore would entail very few operations and also a minimum expense.

By making the springs removable the repair of one of the wheels if such repair becomes necessary would be greatly facilitated.

Some changes may be made in the construction and arrangement of the parts of my wheel without departing from the real spirit and purpose of my invention, and it is my intention to cover by my claims, any modified forms of structure or use of mechanical equivalents, which may be reasonably included within their scope.

I claim as my invention:

1. A resilient wheel including a hub, a felly having inwardly projecting fastening means, a plurality of arms connecting the rim and hub, and arranged in pairs, each arm comprising two pivotally joined links and set at an angle to each other, the adjacent ends of each pair of arms being pivoted at the same points both on the rim and on the hub, springs connecting the pivot point of each pair of arms on the felly to the corresponding pivot points on the hub, and springs connecting the joint of each arm to the corresponding joint of the adjacent arm of the next pair.

2. A resilient wheel including a hub, a felly having inwardly projecting fastening means, a plurality of arms connecting the rim and hub, and arranged in pairs, each arm comprising two links pivotally connected and set at an angle to each other, the adjacent ends of each pair of arms being pivoted at the same points both on the rim and on the hub, springs connecting the pivot point of each pair of arms on the felly to the corresponding pivot points on the hub, springs connecting the aforementioned central pivot of each arm to the corresponding pivot point of the adjacent arm of the next pair, and means for pivotally anchoring said springs to the pivotal connections of said arms.

3. A resilient wheel including a hub, a felly having inwardly projecting fastening means, a plurality of arms connecting the rim and hub, and arranged in pairs, each arm comprising two links pivotally connected, and set at an angle to each other, the adjacent ends of each pair of arms being pivoted at the same points both on the rim and on the hub, springs connecting the pivot point of each pair of arms on the felly to the corresponding pivot points on the hub, springs connecting the aforementioned central pivot of each arm to the corresponding pivot point of the adjacent arm of the next pair, and bolts forming pivots for the arms, said bolts having means for lubricating the bushings of the arms.

4. A resilient wheel including a hub, a felly having inwardly projecting fastening means, a plurality of arms connecting the rim and hub, and arranged in pairs, each arm comprising two links pivotally connected, and set at an angle to each other, the adjacent ends of each pair of arms being pivoted at the same points both on the rim and on the hub, springs connecting the pivot point of each pair of arms on the felly to the corresponding pivot points on the hub, springs connecting the aforementioned central pivot of each arm to the corresponding pivot point of the adjacent arm of the next pair, bolts forming pivots for the arms, said bolts having means for lubricating the bushings of the arms, and cover plates fastened to either side of the wheel, the inner of said plates having an enlarged opening to permit eccentricity of the axle passing therethrough.

5. A resilient wheel including a hub, a felly having inwardly projecting lugs, spokes joining the hub and rim, each spoke comprising four links, having bushings at either end, bolts connecting the links together in the form of a parallelogram, and pivotally connecting the two most distant vertices to the felly and hub respectively, means for lubricating the bushings of the links through said bolts, springs arranged radially of the wheel and connected to those vertices of each parallelogram which are joined to the hub and felly, and springs arranged circumferentially of the wheel and connecting the free vertices of adjacent parallelograms 6. A resilient wheel including a rub, a felly having inwardly projecting lugs, spokes joining the hub and rim, each spoke comprising four links having bushings at either end, bolts connecting the links together in the form of a parallelogram, and pivotally connecting the two most distant vertices to the felly and hub respectively, means for lubricating the bushings of the links through said bolts, springs arranged radially of the wheel and connected to those vertices of each parallelogram which are joined to the hub and felly, springs arranged circumferentially of the wheel and connecting the free vertices of adjacent parallelograms, and cover plates fastened to either side of the wheel, the inner of said plates having an enlarged opening to permit eccentricity of the axle passing therethrough.

7. A resilient wheel including a hub, a felly having inwardly projecting lugs, spokes joining the hub and rim, each spoke comprising four links having bushings at either end, bolts connecting the links together in the form of a parallelogram, and pivotally connecting the two most distant vertices to the felly and hub respectively, means for lubricating the bushings of the links through said bolts, two of the links forming opposite sides of the parallelogram being in the same perpendicular plane and the other two in another, and springs so arranged as to hinder the distortion of said parallelogram caused by the eccentricity of the wheel.

8. A resilient wheel including a hub, a felly having inwardly projecting lugs, spokes joining the hub and rim, each spoke comprising four links connected together in the form of a parallelogram, springs arranged radially of the wheel and connected to those vertices of each parallelogram which are joined to the hub and felly, and springs arranged circumferentially of the wheel and connecting the free vertices of each parallelogram to the corresponding vertices of adjacent parallelograms.

9. A resilient wheel including a hub, a felly having inwardly projecting lugs, spokes joining the hub and rim, each spoke comprising four links connected together in the form of a parallelogram, resilient means aranged radially of the wheel and connected to those vertices of each parallelogram which are joined to the hub and felly, and resilient means arranged circumferentially of the wheel and connecting the free vertices of each parallelogram to the corresponding vertices of adjacent parallelograms.

10. A resilient mounting for vehicle axles comprising spaced normally eccentric supporting members, one in the form of a rim having means for securing it to a vehicle body and the other in the form of a hub or sleeve having the vehicle axle passing therethrough, a plurality of arms connecting the rim and hub arranged in pairs, each arm comprising pivotally jointed links set at an angle to each other the adjacent ends of each pair of arms being pivoted at the same point both on the rim and on the hub, springs connecting the pivot point of each pair of arms on the felly to the corresponding pivot point on the hub and springs connecting the point of each arm to the corresponding joint of the adjacent arm of the last pair.

WILLIAM LISTER.